United States Patent
Audouin

(10) Patent No.: US 7,225,608 B2
(45) Date of Patent: Jun. 5, 2007

(54) SYSTEM FOR PURGING SULFATE FROM A NOX TRAP LOCATED IN AN EXHAUST LINE OF A MOTOR VEHICLE DIESEL ENGINE

(75) Inventor: Arnaud Audouin, Paris (FR)

(73) Assignee: Peugeot Citroen Automobiles SA, Velizy-Villacoublay (FR)

(*) Notice: Subject to any disclaimer, the term of this patent is extended or adjusted under 35 U.S.C. 154(b) by 0 days.

(21) Appl. No.: 11/179,544

(22) Filed: Jul. 13, 2005

(65) Prior Publication Data

US 2006/0010856 A1    Jan. 19, 2006

(30) Foreign Application Priority Data

Jul. 15, 2004    (FR) .................................. 04 07884

(51) Int. Cl.
*F01N 3/00* (2006.01)

(52) U.S. Cl. ............................ 60/285; 60/276; 60/295; 60/297; 60/300

(58) Field of Classification Search ................. 60/274, 60/276, 277, 285, 286, 295, 297, 300
See application file for complete search history.

(56) References Cited

U.S. PATENT DOCUMENTS

| | | | |
|---|---|---|---|
| 5,402,641 A * | 4/1995 | Katoh et al. ................... | 60/285 |
| 6,082,100 A | 7/2000 | Boegner et al. | |
| 6,161,377 A * | 12/2000 | Boegner et al. ............... | 60/285 |
| 6,205,773 B1 * | 3/2001 | Suzuki ......................... | 60/276 |
| 6,378,297 B1 * | 4/2002 | Ito et al. ........................ | 60/284 |
| 6,644,021 B2 * | 11/2003 | Okada et al. .................. | 60/286 |
| 6,729,120 B2 * | 5/2004 | Freisinger et al. ............ | 60/274 |
| 6,763,657 B2 * | 7/2004 | Wachi et al. .................. | 60/285 |
| 6,766,641 B1 * | 7/2004 | Surnilla et al. ................ | 60/285 |
| 6,823,664 B2 * | 11/2004 | Nakatani et al. .............. | 60/295 |
| 6,865,880 B2 * | 3/2005 | Iihoshi et al. ................. | 60/285 |
| 2005/0217254 A1 * | 10/2005 | Uchida et al. ................ | 60/295 |

FOREIGN PATENT DOCUMENTS

| | | |
|---|---|---|
| EP | 0 971 101 A2 | 1/2000 |
| EP | 1 350 932 A2 | 10/2003 |
| FR | 2 835 566 | 8/2003 |

* cited by examiner

*Primary Examiner*—Tu M. Nguyen
(74) *Attorney, Agent, or Firm*—Nicolas E. Seckel

(57) ABSTRACT

A NOx trap is associated with oxidation catalyst-forming structure integrated in a common medium, and is located in an exhaust line of a motor vehicle diesel engine. The engine can be controlled at least with a rich mixture control strategy and with lean mixture control strategies of level 1 and level 2. The system acquires the temperatures upstream and downstream torn the trap, and on detecting a request to purge sulfate, it compares the temperatures with first and second curves for controlling operation of the engine with a rich mixture if the temperatures lie between said curve, and otherwise with a lean mixture. The system also compares the temperatures with third and fourth curves for controlling operation of the engine to apply the level 2 strategy if the temperatures lie between said curves, Or otherwise to apply the level 1 strategy.

11 Claims, 3 Drawing Sheets

SYSTEM FOR PURGING SULFATE FROM A NOX TRAP LOCATED IN AN EXHAUST LINE OF A MOTOR VEHICLE DIESEL ENGINE

FIELD OF THE INVENTION

The present invention relates to a system for purging sulfate from a NOx trap associated with oxidation catalyst-forming means integrated in a common medium, and located in an exhaust line of a motor vehicle diesel engine.

More particularly, the invention relates to such a system in which the engine is associated with common rail means for feeding fuel to the cylinders of the engine, and responsive to modified engine-operation control parameters to cause the engine to switch between lean mixture operation and rich mixture operation, the feed means being adapted to define at least two control strategies for operating the engine with a lean mixture referred to as level 1 and level 2 strategies, so as to obtain different temperature levels in the exhaust line, with the temperature level obtained by applying the level 2 strategy being higher than that obtained by applying the level 1 strategy.

BACKGROUND OF THE INVENTION

Typically, a motor vehicle diesel engine is associated with means for processing its exhaust gases for the purpose of reducing the quantity of pollution rejected into the atmosphere, and in particular the quantity of nitrogen oxides or NOx.

To this end, the engine is generally associated with a NOx trap arranged in its exhaust line and adapted to store such particles in the form of a nitrate on specific storage sites, such as barium, for example.

In order to regenerate the NOx trap, operation of the engine is switched over to a rich mixture so as to release into the exhaust line a sufficient quantity of reducers of the nitrate contained in the trap, e.g. HC and CO. The nitrate is then reduced and desorbed in the form of $N_2$ and the storage sites are released so that they can then again store NOx.

Unfortunately, the storage sites are also capable of storing sulfates when they are exposed to the $SO_2$ generated by the engine from the sulfur contained in the fuel and the lubricating oil of the engine. The trap thus becomes progressively saturated in sulfates, thereby having the effect of reducing its catalytic performance.

It is therefore necessary to purge the trap regularly of sulfates in order to eliminate the sulfates that are stored therein.

Unfortunately, because of the great thermodynamic stability of sulfates, merely switching the engine into rich mode does not suffice to reduce the sulfates. For this purpose, it is also necessary to raise the temperature of the trap up to high temperatures of the order of 700° C.

For this purpose, the NOx trap is generally associated with catalyst-forming means arranged upstream therefrom or integrated in the same medium as the trap. The catalyst-forming means are adapted to burn hydrocarbons coming from the engine and thus generate heat for raising the temperature of the trap.

Typically, for purging sulfate from the NOx trap, the engine is controlled to operate with two types of lean mixture. A first lean mixture is determined so as to perform preliminary raising of the temperature of the catalyst-forming means so that they reach a primed state. Once in their primed state, the catalyst-forming means are capable of burning large quantities of hydrocarbons delivered by the engine when operating with its second lean mixture, thereby enabling a high temperature level to be obtained in the NOx trap.

Unfortunately, although it is necessary to purge the NOx trap of sulfate in order to guarantee some minimum level of catalytic performance therefor, it is known that high temperatures damage the trap irreversibly, since the materials constituting the storage sites are degraded by such high temperatures, which amounts to accelerating the aging of the trap.

It is therefore necessary to control the temperature of the trap in a manner that is appropriate for achieving a compromise between effective sulfate purging and premature aging of the trap.

Furthermore, sulfates are released essentially in the form of $SO_2$ when the mixture is rich in oxygen, and in the form of $H_2S$ (a foul-smelling gas) when the mixture is poor in oxygen.

The formulation of a NOx trap can advantageously contain oxygen storage compounds (OSC) that release oxygen when the exhaust gas is poor in oxidizing species, i.e. when the engine switches over from operating in rich mode to operating in lean mode.

However, the oxygen storage capacity of the NOx trap is not unlimited, so the available stored oxygen is used up quickly. Thus, when purging sulfate, once the temperature is high enough to enable sulfates to be released, they are initially desorbed in the form of $SO_2$ and then in the form of $H_2S$.

OBJECTS AND SUMMARY OF THE INVENTION

The object of the present invention is thus to propose a system that enables the NOx trap to be maintained in a temperature window for maximizing sulfate purging efficiency, while minimizing the risk of the NOx trap aging and of $H_2S$ being emitted by purging sulfate.

To this end, the invention provides a system for purging sulfate from a NOx trap associated with oxidation catalyst-forming means integrated in a common medium, and placed in an exhaust line of a motor vehicle diesel engine, in which the engine is associated with common rail means for feeding fuel to the cylinders of the engine, and responsive to modified engine-operation control parameters to cause the engine to switch between lean mixture operation and rich mixture operation, the feed means being adapted to define at least two control strategies for operating the engine with a lean mixture referred to as "level 1" and "level 2" strategies, so as to obtain different temperature levels in the exhaust line, with the temperature level obtained by applying the level 2 strategy being higher than that obtained by applying the level 1 strategy, the system comprising:

means for detecting a request to purge the NOx trap of sulfate;

means for acquiring temperatures upstream and downstream from the medium of the NOx trap and of the catalyst-forming means in order to define a temperature operating point thereof;

first comparator means for comparing said operating point with first and second predetermined low and high limit curves for controlling engine operation in rich mode if the operating point lies in the range defined between the first and second curves, or in lean mode if the operating point lies outside said range; and second comparator means for comparing said operating point with third and fourth predetermined low and high limit curves for controlling engine operation with the level 2 strategy if the operating point lies in the range defined by the third and fourth curves, or with the level 1 strategy if the operating point lies outside said range.

According to other characteristics:

if the operating point lies simultaneously in the range defined by the first and second curves and in the range defined by the third and fourth curves, the engine is controlled to operate with a rich mixture;

the operation of the engine is controlled to operate with a rich mixture for no longer than a first predetermined duration;

the first predetermined duration is equal to about 10 seconds (s);

the operation of the engine is controlled with a lean mixture at least for a second predetermined duration;

the second predetermined duration lies in the range about 2 s to about 3 s;

if the accumulated durations of all periods of operation of the engine in rich mode is greater than a third predetermined duration, the purging of sulfate from the NOx trap is stopped; and the third duration is equal to about 270 s.

BRIEF DESCRIPTION OF THE DRAWINGS

The invention can be better understood on reading the following description given purely by way of example and made with reference to the accompanying drawings, in which.

MORE DETAILED DESCRIPTION

Figure 1:
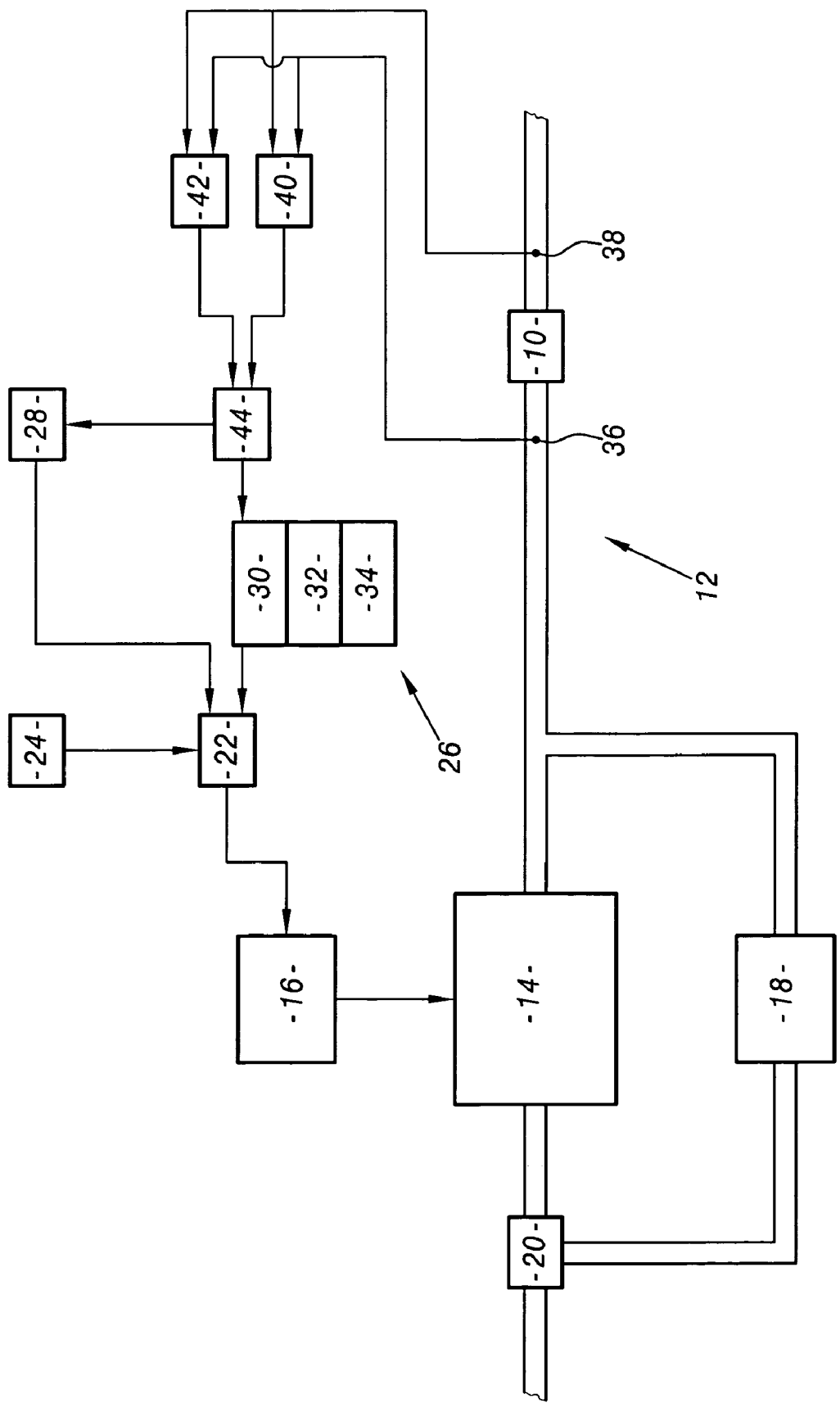
FIG. 1 is a diagrammatic view of the system of the invention associated with a motor vehicle diesel engine.

In FIG. 1 there can be seen a diagram of a system for purging sulfate from a NOx trap 10 arranged in an exhaust line 12 of a motor vehicle diesel engine 14.

The NOx trap 10 also serves to catalyze hydrocarbons by integrating catalyst-forming means in its medium.

The engine 10 is also associated with common rail means 16 for feeding fuel to the cylinders of the engine, and with means 18 for recirculating a fraction of the exhaust gas to the intake of the engine, thereby delivering exhaust gas to means 20 for admitting a mixture of air and exhaust gas to the intake of the engine.

The common rail means 16 are responsive to modified parameters for controlling operation of the engine 14, to cause the engine to switch between operating with a lean mixture and operating with a rich mixture.

This is achieved under the control of a feed supervisor 22 which selects a set of operating parameters for the engine and delivers the set to the common rail means 16. Such a set is selected from two sets of parameters delivered by control strategy means 24, 26 for controlling the operation of the engine.

This selection is performed as a function of a signal coming from means 28 for issuing a request to purge sulfate from the NOx trap, or to stop such purging.

If no sulfate-purge request is issued, or if a request is issued to end sulfate purging, the supervisor 22 selects the set of parameters from the control strategy means 24. For the feed means 16, this step defines a first control strategy in which the engine is caused to operate with a lean mixture during normal operation of the engine.

If a request for sulfate purging is issued, the supervisor 22 selects the set of parameters from the control strategy means 26. These means 26 select and output, in a manner explained in greater detail below, one of the following sets of parameters:

a first set of parameters 30 defining, for the feed means 16, a second control strategy for operating the engine with a lean mixture, referred to as "level 1" strategy. This strategy is defined to obtain a first temperature level in the medium of the NOx trap and of the catalyst-forming means, this first temperature level being greater than that obtained by applying the first lean mixture strategy;

a second set of parameters 22 defining, for the feed means 16, a third control strategy for operating the engine with a lean mixture, referred to as "level 2" strategy. This strategy is defined to obtain a second temperature level in the medium of the NOx trap and of the catalyst-forming means, this second temperature level being higher than that obtained by applying the level 1 strategy; and a third set of parameters 34 defining, for the feed means 16, a control strategy for operating the engine with a rich mixture in order to purge sulfate from the NOx trap.

Applying the level 1 strategy serves to raise the temperature of the catalyst-forming means so that they reach a primed state needed for application of the level 2 strategy. The level 2 strategy generates a large amount of heat suitable for raising the internal temperature of the NOx trap 10 to the temperatures required for purging sulfate therefrom, as is known per se in the state of the art.

The system of the invention further comprises means 36, 38 for acquiring the temperatures AT1 and AT2 respectively upstream and downstream of the medium of the NOx trap and the catalyst-forming means.

The upstream and downstream pair of temperatures (AT1, AT2) relating to the medium defines a temperature operating point thereof.

It can be shown that this operating point is representative of the internal temperature of the medium of the NOx trap and of the catalyst-forming means. Thus, by switching between the various control strategies for the operation of the engine as a function of this operating point, the NOx trap is purged of sulfate as a function of its internal temperature. It is thus possible to control said temperature so that it reaches and then remains within a predetermined range of temperatures that are optimal for purging sulfate, while minimizing the aging of the NOx trap, for example the range 650° to 750°, as explained in greater detail below.

Figure 2A:
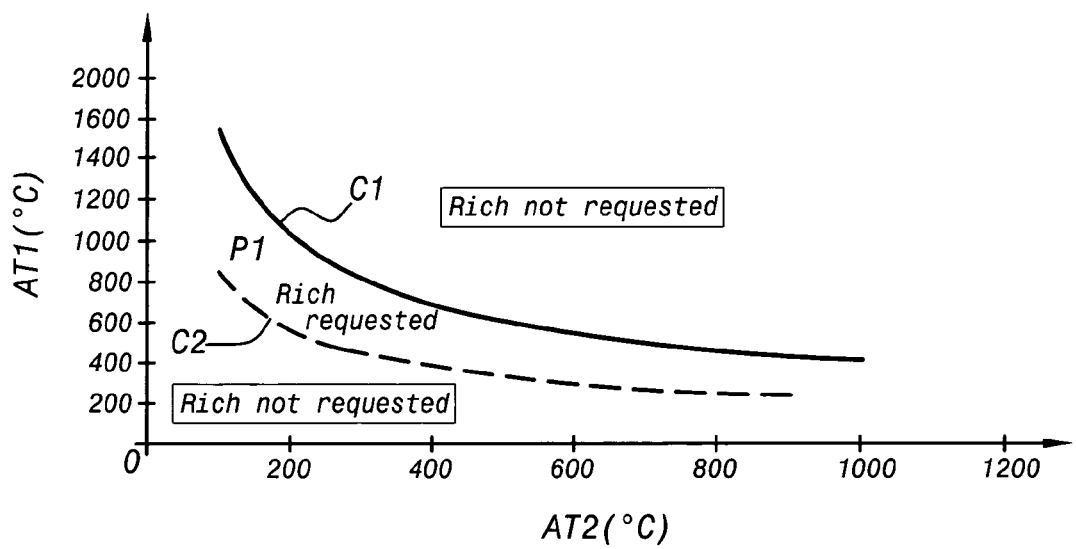
FIG. 2A is a graph showing the mapping of the first comparator means forming part of the structure of the FIG. 1 system.

The operating point is delivered to first means 40 for comparison with first and second curves representing high and low limits in a first predetermined mapping shown in FIG. 2A.

As shown in FIG. 2A, the first and second curves representing high and low limits and respectively referenced C1 and C2 in FIG. 2A serve to define a range P1. If the operating point lies in the range P1, then a request to control the operation of the engine in rich mode is issued by the first comparator means 40, which means otherwise issue a request to control the operation of the engine in lean mode.

Figure 2B:
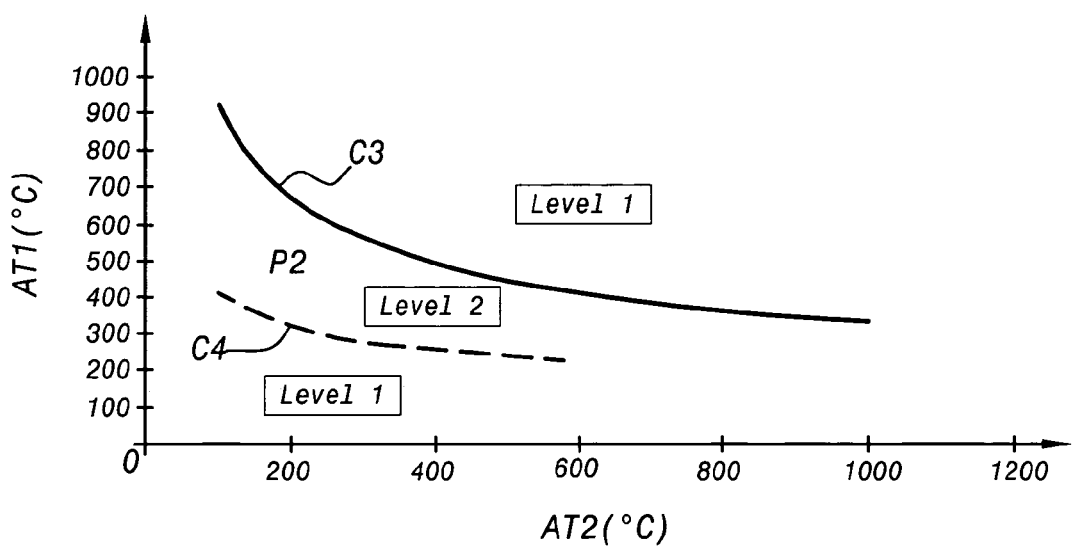
FIG. 2B is a graph showing the mapping of the second comparator means forming part of the structure of the FIG. 1 system.

The operating point is also delivered to second comparator means 42 for comparison with third and fourth curves representing high and low limits in a second predetermined mapping shown in FIG. 2B.

As can be seen in FIG. 2B, the third and fourth curves representing high and low limits and respectively referenced C3 and C4 in FIG. 2B serve to define a range P2. If the operating point lies in the range P2, then a request to control operation of the engine with the level 2 strategy is issued by the second comparator means 42, which means otherwise issue a request to control the operation of the engine with the level 1 strategy.

The requests issued by the first and second comparator means 40 and 42 are delivered to management means 44 for managing priorities between the requests of the comparator means 40 and 42 and for managing the lengths of time the engine passes in each of its various control strategies with a rich mixture, and with a level 1 or a level 2 lean mixture.

Concerning the management of priorities between requests, the management means 44 issue a strategy selection signal to the means 26 to switch the operation of the engine in application of the following rules:

if the requests for rich mode control and for level 2 strategy control are issued simultaneously, i.e. if the operating point lies simultaneously in both ranges P1 and P2, then the management means 44 gives priority to controlling the operation of the engine with a rich mixture;

if the requests for control with a rich mixture and control with the level 1 strategy are issued simultaneously, then the management means 44 select controlling the operation of the engine with a rich mixture; and if a request for control with a lean mixture is issued by the first comparator means 40, then the management means 44 select the control strategy that corresponds to the request coming from the second comparator means 42, i.e. either the level 1 strategy or the level 2 strategy, depending on whether or not the operating point lies in range P2.

Concerning the durations spent by the engine in the various strategies, the management means 44 also apply the following rules:

if the duration spent by the engine in rich-mixture operation, since switching over into said mode of operation, exceeds a first predetermined duration, e.g. about 10 s, then the management means 44 select the strategy requested by the second comparator means 42. The engine is thus switched into operating with a lean mixture in order to minimize emissions of $H_2S$; and if the engine is operating with a lean mixture, i.e. if either the level 1 strategy or the level 2 strategy is in operation, then the management means 44 inhibit the strategy of control with a rich mixture at least during a second predetermined duration, e.g. of about 2 s to 3 s. The engine is then controlled with a lean mixture at least for said duration. This enables the high limit of the optimum temperature range to be reached, such that when operation of the engine is switched into operation with a rich mixture, the internal temperature of the NOx trap does not leave this range prematurely, which would have the consequence of causing engine operation to oscillate. This also leaves the NOx trap sufficient time to store sufficient oxygen to enable sulfate to be desorbed in the form of $SO_2$ next time the operation of the engine is switched over to rich mode.

The management means 44 are also adapted to detect and deliver to emission means 28 a signal indicating the end of sulfate purging.

More particularly, the management means 44 are adapted to measure the total cumulative duration spent by the engine in rich mode operation since the beginning of sulfate purging. If this duration exceeds a predetermined duration, e.g. about 270 s, then the NOx trap has been purged of sulfate. The management means 44 then deliver an end-of-sulfate-purging signal to the emission means 28 which respond by emitting a stop-sulfate-purging signal to the supervisor 22.

Figure 3:
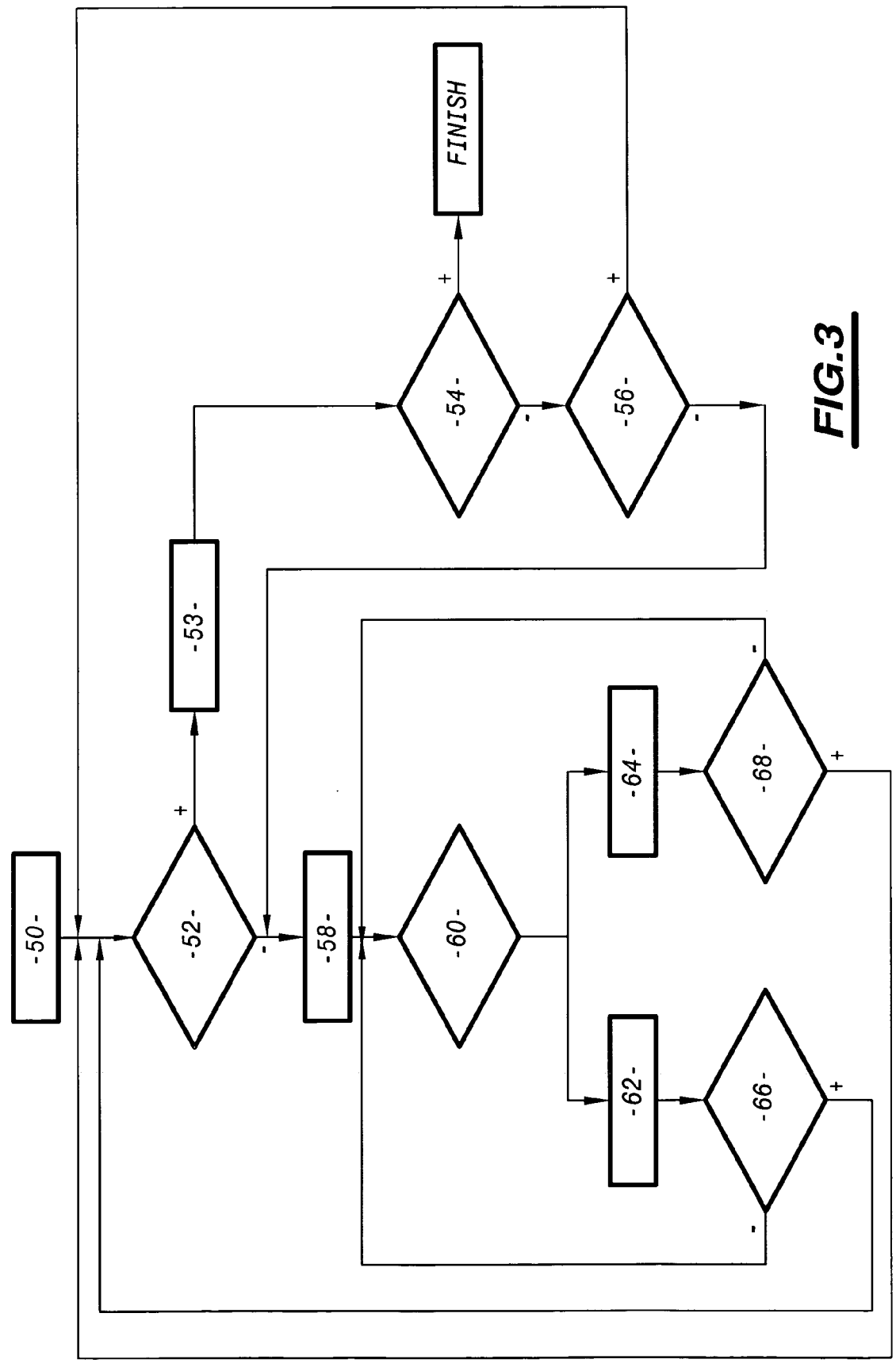
FIG. 3 is a flow chart showing the operation of the FIG. 1 system.

FIG. 3 is a flow chart of the operation of the system of the invention.

In a step 50, a request for sulfate purging is issued and the operation of the engine is controlled in application of the various rich mixture or level 1 lean mixture or level 2 lean mixture strategies.

In a step 52, a test is performed to determine whether the operating point lies in the range P1 for engine operation with a rich mixture. If the result of this test is positive, the engine is switched at 53 into its rich mixture operation mode.

The operation of the system of the invention then continues with a step 54 of testing the total cumulative duration spent by the engine in operation with a rich mixture since the beginning of sulfate purging.

If this duration exceeds 270 s, an end-of-sulfate-purging request is issued. Otherwise, a test is triggered in a step 56 on the duration that the engine has spent in rich mixture operation since switching over to that mode. If this duration does not exceed 10 s, step 56 loops back to step 52.

If this duration does exceed 10 s, then the operation of the engine is switched into lean mixture operation in a step 58.

A test is then performed in step 60 to determine whether the operating point lies in the range P2 for operating the engine with the level 2 strategy. If the level 2 strategy is selected, the engine is switched in a step 62 to operating with level 2 strategy, whereas if the level 1 strategy is determined, the engine is switched in a step 64 to operating with level 1 strategy.

Following steps 62 and 64, a test is performed in respective steps 66 and 68 to determine whether the time that has been spent by the engine since switching over its operation to a lean mixture exceeds 2 s. If the result of this test is negative, then both steps 66 and 68 loop back to step 60.

If the result of this test is positive, then both steps 66 and 68 loop back to step 52 in order to determine whether the engine can be switched over to operating with a rich mixture.

As can be seen, the management of priorities and the durations spent by the engine operating with the various control strategies is implemented by suitably ordering tests concerning the engine operation control strategies and the durations associated therewith.

The high and low limit curves of the first and second comparator means and the predetermined durations associated with the control strategies are determined, e.g. experimentally, so that the internal temperature of the NOx trap lies in the optimum temperature range 650° C. to 750° C. while it is being purged of sulfate, and so that the emission of $H_2S$ is minimized.

The system of the invention can be implemented in a central information processing unit running software instructions, e.g. an engine control unit (ECU) or a dedicated central processing unit. The system of the invention may also be implemented using specifically dedicated hard-wired circuits.

Naturally, other embodiments of the invention are possible.

What is claimed is:

1. A system for purging sulfate from a NOx trap associated with oxidation catalyst-forming means integrated in a common medium, and placed in an exhaust line of a motor vehicle diesel engine, in which the engine is associated with common rail means for feeding fuel to the cylinders of the engine, and responsive to modified engine-operation control parameters to cause the engine to switch between lean mixture operation and rich mixture operation, the feed means being adapted to define a normal operating strategy in which the engine is operated in a lean mixture and a purging control strategy in which the engine is operated to cause a purge of the NOx trap, the purging control strategy comprising a first sub-strategy for operating the engine with a rich mixture and at least two sub-strategies for operating the engine with a lean mixture referred to as "level 1" and "level 2" strategies, so as to obtain different temperature levels in the exhaust line, with the temperature level obtained by applying the level 2 strategy being higher than that obtained by applying the level 1 strategy, and wherein a temperature level obtained by applying the level 1 strategy is higher than a temperature obtained by applying the normal operating strategy, the system comprising: means for detecting a request to purge the NOx trap of sulfate; means for acquiring temperatures upstream and downstream from the medium of the NOx trap and of the catalyst-forming means in order to define a temperature operating point thereof; first comparator means for comparing said operating point with first and second predetermined low and high limit curves for controlling engine operation in rich mode if the operating point lies in the range defined between the first and second curves, or in lean mode if the operating point lies outside said range; and second comparator means for comparing said operating point with third and fourth predetermined low and high limit curves for controlling engine operation with the level 2 strategy if the operating point lies in the range defined by the third and fourth curves, or with the level 1 strategy if the operating point lies outside said range, wherein the first, second, third, and fourth curves are mapping curves as a function of upstream and downstream temperatures, wherein at least one of the first, second, third, and fourth curves is a non-linear curve.

2. A system according to claim 1, wherein, if the operating point lies simultaneously in the range defined by the first and second curves and in the range defined by the third and fourth curves, the engine is controlled to operate with a rich mixture.

3. A system according to claim 1, wherein at least the first and second curves are non-linear curves.

4. A system according to claim 1, wherein at least the third and fourth curves are non-linear curves.

5. A system according to claim 1, wherein the first, second, third, and fourth curves are non-linear curves.

6. A system according to claim 1, wherein the operation of the engine is controlled to operate with a rich mixture for no longer than a first predetermined duration.

7. A system according to claim 6, wherein the first predetermined duration is equal to about 10 s.

8. A system according to claim 1, wherein the operation of the engine is controlled with a lean mixture at least for a second predetermined duration.

9. A system according to claim 8, wherein the second predetermined duration lies in the range about 2 s to about 3 s.

10. A system according to claim 1, wherein, if the accumulated durations of all periods of operation of the engine in rich mode is greater than a third predetermined duration, the purging of sulfate from the NOx trap is stopped.

11. A system according to claim 10, wherein the third duration is equal to about 270 s.

* * * * *